(12) United States Patent
Farag et al.

(10) Patent No.: US 6,758,742 B2
(45) Date of Patent: Jul. 6, 2004

(54) AIR PARTITIONING DEVICE FOR AIR CONDITIONING SYSTEM

(75) Inventors: Ashraf A. Farag, Williamsville, NY (US); John W. McLaughlin, E. Amherst, NY (US); Thomas R. Johnson, Lewiston, NY (US); John Lawrence Pawlak, III, Orchard Park, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/197,056

(22) Filed: Jul. 16, 2002

(65) Prior Publication Data

US 2004/0014418 A1 Jan. 22, 2004

(51) Int. Cl.⁷ ................................................ B60H 3/00
(52) U.S. Cl. .................... 454/156; 454/160; 165/42
(58) Field of Search .................................. 454/121, 156; 165/42, 43

(56) References Cited

U.S. PATENT DOCUMENTS

| 5,884,689 | A | * | 3/1999 | Takechi et al. | ............... 165/43 |
| 6,508,701 | B1 | * | 1/2003 | Foury et al. | ................ 454/121 |
| 6,581,678 | B1 | * | 6/2003 | Groemmer et al. | ........... 165/42 |
| 6,595,276 | B2 | * | 7/2003 | Bendell et al. | ............. 165/202 |

\* cited by examiner

Primary Examiner—Gregory Wilson
(74) Attorney, Agent, or Firm—Patrick M. Griffin

(57) ABSTRACT

An air partitioning device for a vehicle heating, ventilation, and air-conditioning system to divide a hot air stream into separate portions comprises an L-shaped front portion including a base leg and a dividing leg, and also comprises a tail portion extending from a back of the front portion, the tail portion oriented angularly to the dividing leg.

27 Claims, 4 Drawing Sheets

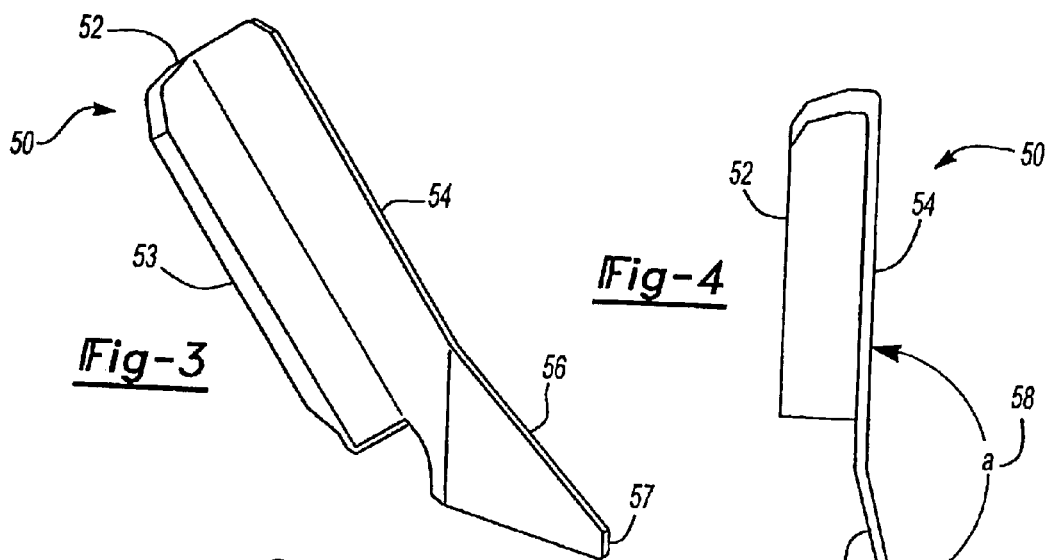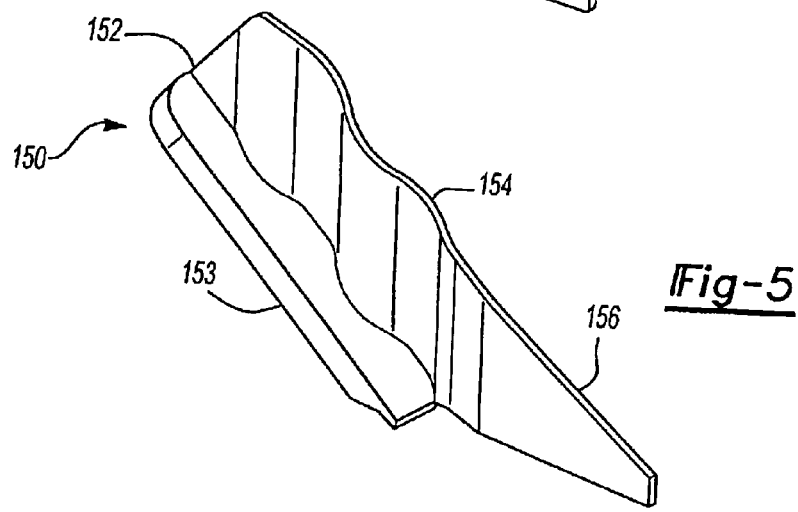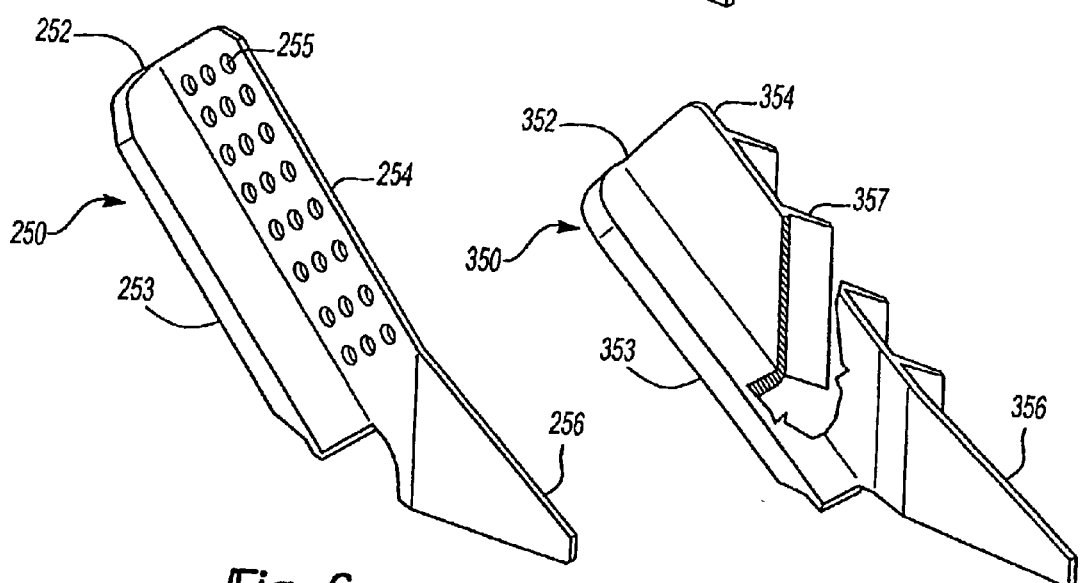

AIR PARTITIONING DEVICE FOR AIR CONDITIONING SYSTEM

TECHNICAL FIELD

The above-referenced invention relates to vehicle heating, ventilation and air-conditioning systems, and more specifically to a device to partition hot and cold air for directing airflow to different portions of the vehicle interior.

BACKGROUND OF THE INVENTION

Vehicle ventilation systems have long been utilized in vehicles to provide comfort to the vehicle occupants. Initial ventilation systems comprised a simple duct that was opened or closed by a manually operated valve directing outside ambient air to the vehicle interior. Through the years, consumers have desired increased interior comfort and manufacturers have delivered systems to satisfy consumer demand for improved interior temperature control. Advances made over the years include directing air through a heated core for delivering hot air to the vehicle interior and also for delivering hot air to the windshield to keep the windshield clear of frost and moisture. Subsequently, air conditioners have also become commonplace accessories in vehicles to provide cool air for the comfort of passengers in summer's heat.

Heating, ventilation, and air-conditioning systems in today's vehicles now provide total interior climate control. These new systems automatically maintain a desired temperature by delivering an appropriate mix of ambient, cooled, and heated air to the vehicle interior. More advanced systems also permit occupants to select a desired temperature for their individual zones and automatically maintain these zones at the pre-selected temperature. Such operation necessarily requires the automatic operation of the vehicle HVAC system wherein the ambient, cooled, and heated air are directed into an air distribution module to be ducted to the desired areas of the vehicle.

A prior art HVAC system is shown generally at 10 in FIG. 1. The vehicle HVAC system 10 is comprised of core module 12 and air distribution module 30. Ambient outside air or recirculated interior air is directed to air inlet 14 and is subsequently directed through air-conditioning evaporator 16 by the HVAC blower (not shown). After the air exits from evaporator 16 to pass between point 19 and wall 20, part of the air is directed through cool inlet area 22 and part of the air is directed to warm air passage 24. Inlet 22 and passage 24 are variable in area depending upon the position of air mix door 18. Air mix door 18 is hinged to pivot such that the position of air mix door 18 is directly related to the desired air temperature of air to be output to the interior of the vehicle. Thus, to obtain the maximum amount of cool air, air mix door 18 is rotated counterclockwise to maximize the area of cool air inlet 22. If heated air is desired, air mix door 18 is rotated clockwise to create a warm air passage 24 thereby diverting a portion of the air-flow exiting from evaporator 16 to flow through heater core 26 and duct the heated air through heated air inlet 28. An intermediate position of air mix door 18 facilitates a mixture of cool and hot air simultaneously entering air chamber 32 of air distribution module 30 to provide air at a desired temperature.

Air distribution module 30 typically has three designated outlets for delivering the conditioned air to different portions of the vehicle. These outlets are generally referred to as a defrost outlet 36 for delivering air to the interior surface of the windshield, vent outlet 40 for delivering air to the upper portion of the vehicle interior, and a heater outlet 44 for delivering air to the foot wells of the vehicle interior. Valves 34, 38, and 42 can be selectively positioned in closed, opened, or intermediate positions to place the desired HVAC system in the desired function. The HVAC system 10 is typically located in the center of the vehicle as are outlets 36, 40, and 44. Although there may be some mixing of the air upon entry to air distribution module 30, it is readily apparent that in such a configuration cool or ambient air is biased to the defrost outlet 36 and the heated air is biased to the heater opening 44, thereby causing a large temperature split between the defrost and heater airflows.

The defrost outlet 36 concentrates defroster airflow to the interior portion of the windshield to clear the windshield of frost or fog. Since the airflow from the heated air inlet 28 enters the distribution module at a lower point than the air from the cool air inlet 22, cool air is most proximate to defrost air outlet 36. Thus, the top defrost outlet 36 is prone to discharging air that is substantially cooler than the air discharged through heater outlet 44 when air mix door 18 is in an intermediate position. In some cases this temperature differential can be as much as 40 degrees Fahrenheit. When the vehicle windshield is fogged or frosted over, it is desirable to have heated air ducted out of defrost valve 36 instead of cool air. U-shaped channels have been utilized in the past in attempts to channel additional heated air from the heated air inlet 28 to defrost valve 36, however these channels have not produced the performance desired.

Thus, there is a need for an HVAC system for use in vehicle heating, ventilation, and air-conditioning systems that provides a more efficient distribution of heated air to the defrost valve for more rapid clearing of fog or frost from the windshield.

SUMMARY OF THE INVENTION

In one aspect, the present invention includes an air partitioning device for a vehicle heating, ventilation, and air-conditioning system to divide a hot air stream into separate portions. The air partitioning device comprises an L-shaped front portion including a base leg and a dividing leg, and also comprises a tail portion extending from a back of the front portion, the tail portion oriented angularly to the dividing leg.

In another aspect of the present invention, a vehicle heating, ventilation, and air-conditioning module is of the type having an air conditioning evaporator through which a cold air stream is delivered through a cold air outlet, and a heater core through which a hot air stream is delivered through a hot air outlet, such that the cold air outlet and the hot air outlet are oriented to cause the hot and cold air streams to mix after passing through their respective outlets for further distribution in a vehicle. The module further includes at least one air partitioning device comprising an L-shaped front portion having a base leg and a dividing leg, and a tail portion extending from a back of the front portion. The air partitioning device is affixed over the cold air outlet and positioned with respect to the hot air outlet to divide a portion of the hot air stream to bypass the cold air outlet.

Yet another aspect of the present invention is a method of dividing a hot air stream in a vehicle heating, ventilation, and air-conditioning module having a hot air stream exiting from a hot air outlet adjacent to a cold air outlet exiting a cold air stream for mixing the hot and cold air streams to prevent the divided portion of the hot air stream from mixing with the cold air stream. An air partitioning device is formed having an L-shaped front portion including a base leg and a dividing leg and further having a tail portion extending from a back of the front portion. The air partitioning device is affixed to the vehicle heating, ventilation, and air-conditioning module such that the base leg covers a portion of the cold air outlet and the dividing leg and tail portion separates the hot air stream into a portion that mixes with the cold air and an auxiliary hot air portion that bypasses the cold air opening.

These and other features and advantages of the present invention will be further understood and appreciated by those skilled in the art by reference to the following specification, claims and appended drawings.

BRIEF DESCRIPTION OF THE DRAWINGS

FIG. 3 is a perspective view of the air partitioning device.

FIG. 4 is a plan view of the air partitioning device.

FIG. 5 is a perspective view of an alternate air partitioning device incorporating a wave-like partitioning wall.

FIG. 6 is a perspective view of an alternate air partitioning device incorporating a perforated partitioning wall.

FIG. 7 is a perspective view of an alternate air partitioning device incorporating a partitioning wall having vanes on one side thereof.

DESCRIPTION OF THE PREFERRED EMBODIMENT

Figure 2:
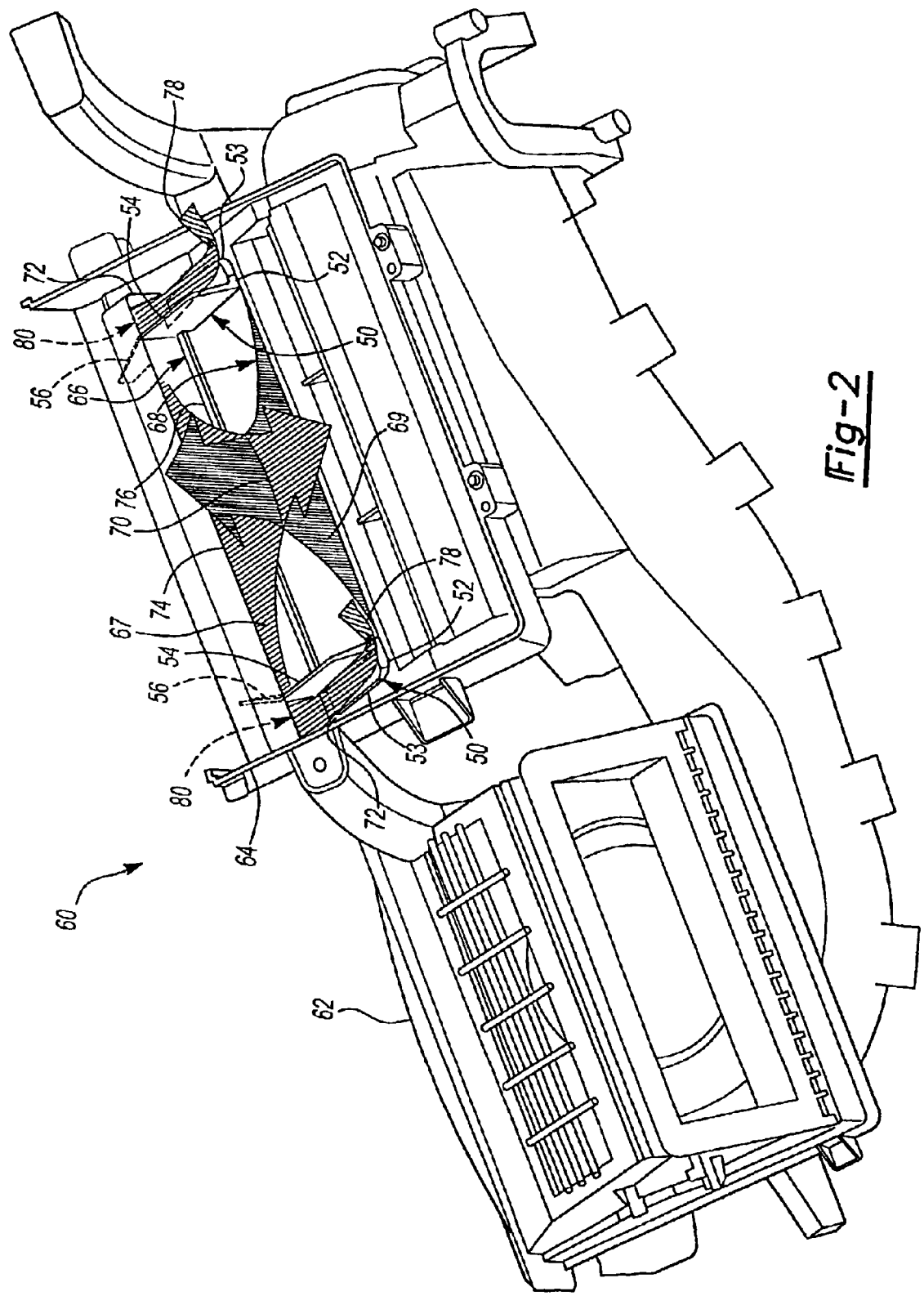
FIG. 2 is a perspective view of a heating, ventilation and air-conditioning system including an air partitioning device embodying the present invention wherein the air distribution module is removed for clarity.

For purposes of description herein, the terms "upper", "lower", "left", "rear", "right", "front", "vertical", "horizontal", and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 3–4, an air partitioning device according to one embodiment of the present invention is shown generally at 50. Air partitioning device 50 comprises a forward portion 52 and a tail portion 56. Forward portion 52 has two legs formed generally as an L-shaped bracket. A base leg 53 for blocking a portion of a cold air stream from an evaporator joins with a divider leg 54 for dividing a hot air stream from a heater core into multiple hot air streams. Tail portion 56 extends from divider leg 54 at an obtuse angle 'a' 58 and can taper from the height of leg 54 to a smaller height at a back end 57 of tail portion 56. Generally, two air partitioning devices 50 are utilized in each application wherein a first device 50 is utilized in a configuration substantially as shown, and a second air partitioning device 50 is a mirror image of the first air partitioning device.

As shown in FIG. 2, a heating, ventilation and air-conditioning (HVAC) system 60 including an air partitioning device 50 embodying the present invention is adapted to direct a desired portion 78 of the hot air stream from the heater core past the cold air outlet 68 without mixing with cool air from the cool air portion of the HVAC system.

The HVAC system 60 of FIG. 2 includes a core module 62 which is substantially identical to core module 12 as described above and shown here schematically. Core module 62 houses an air conditioner evaporator and a heater core with an air mix door therebetween to selectively divert the air-flow from evaporator to an air distribution module, through the heater core or a selected combination thereof in a manner similar to that described above and well known in the art. Core module 62 has a rim 64 for mating with a distribution module (not shown). The distribution module in combination with the core module 62 defines a chamber into which a hot air stream 67 from the heater core is directed through hot air outlet 66 defined by top wall 74, bottom wall 76, and side walls 72. Hot air outlet 66 is generally in close proximity to cold air outlet 68 through which is directed a cold air stream 69. The hot air stream 67 and cold air stream 69 combine to form mixed air 70 in the air distribution module for directing to various outlets (not shown) in the vehicle interior. As a result of the mixing of hot air stream 67 and cold air stream 69, mixed air 70 has a temperature intermediate to hot air stream 67 and cold air stream 69.

With continued reference to FIG. 2, separate hot air streams 78 are divided from hot air stream 67 to avoid mixing with cold air stream 69 for the purpose of delivering an auxiliary hot air stream 78 to defrost outlets in the distribution module. The division of hot air stream 67 to produce auxiliary hot air streams 78 is accomplished by installing an air partitioning device 50 at each end of hot air outlet 66. Air partitioning device 50 is positioned such that tail portion 56 extends into hot air outlet 66 and diverges away from sidewall 72 to form in combination with sidewall 72 a funnel like passageway 80. Base leg 53 of air partitioning device 50 is placed over the end portions of cold air outlet 68 to prevent a portion of cold air stream 69 from mixing with auxiliary hot air stream 78. Divider leg 54 of partitioning device 50 maintains separation of auxiliary hot air stream 78 from hot air stream 67, 50 that auxiliary air stream 78 can be further directed to the defrost openings in the distribution module. Air partitioning device 50 can be added to an existing or new base module 62 by bonding device 50 in its desired position, or alternatively can be molded in place during the molding of the base module 62 without deviating from the intent of the disclosure herein.

The portion of hot air stream 67 that is captured and divided into auxiliary air stream 78 can be regulated by varying the width of base leg 53 wherein a small width divides a smaller portion 78 away from hot air stream 67 than does an air partitioning device 50 having a large width base 53. Likewise, the amount of hot air diverted into auxiliary stream 78 is also dependent on the angle 'a' 58 of the tail divergence from divider wall 54 and upon the length of tail portion 56. As angle 'a' 58 decreases (becomes more acute), tail portion 56 extends further into hot air stream 67 and thus captures a greater volume of hot air directed into auxiliary hot air stream 78. Similarly, as the length of tail portion 56 is increased, a greater amount of hot air stream is captured to be divided therefrom.

Figure 1:
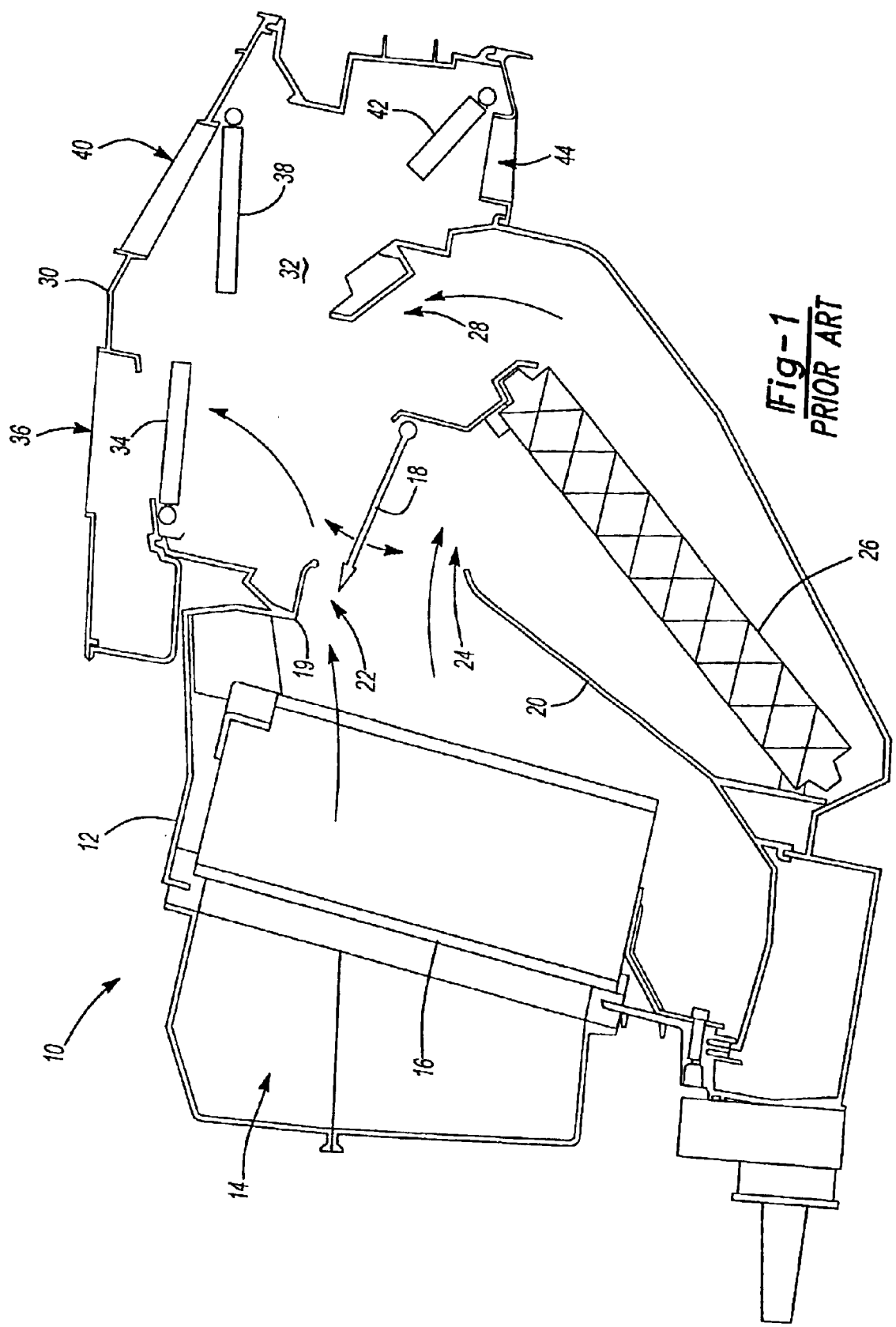
FIG. 1 is an elevational cross-section of a typical heating, ventilation and air-conditioning module of the prior art illustrating the airflow therethrough.
Figure 8:
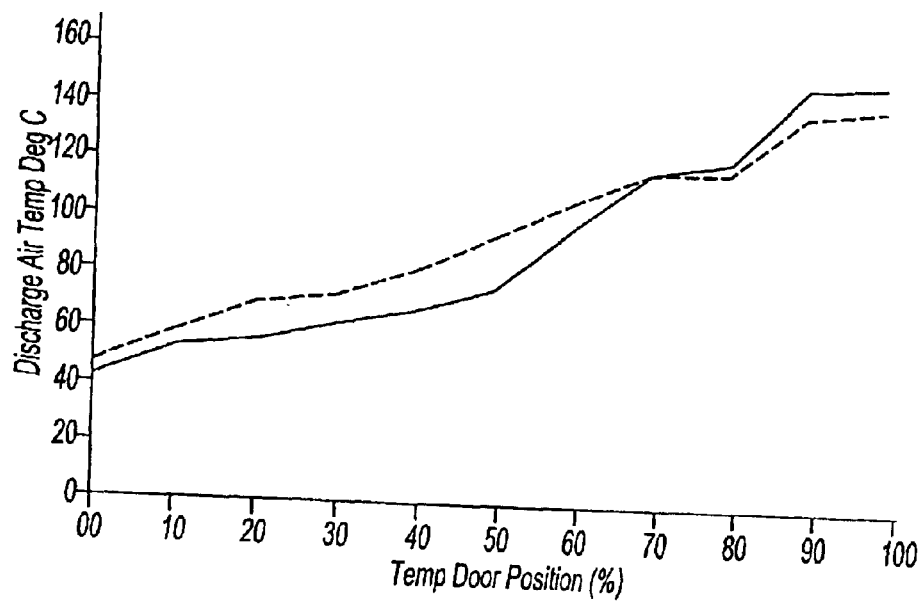
FIG. 8 is a graph illustrating the performance of a typical prior art HVAC system utilizing U-shaped channels.
Figure 9:
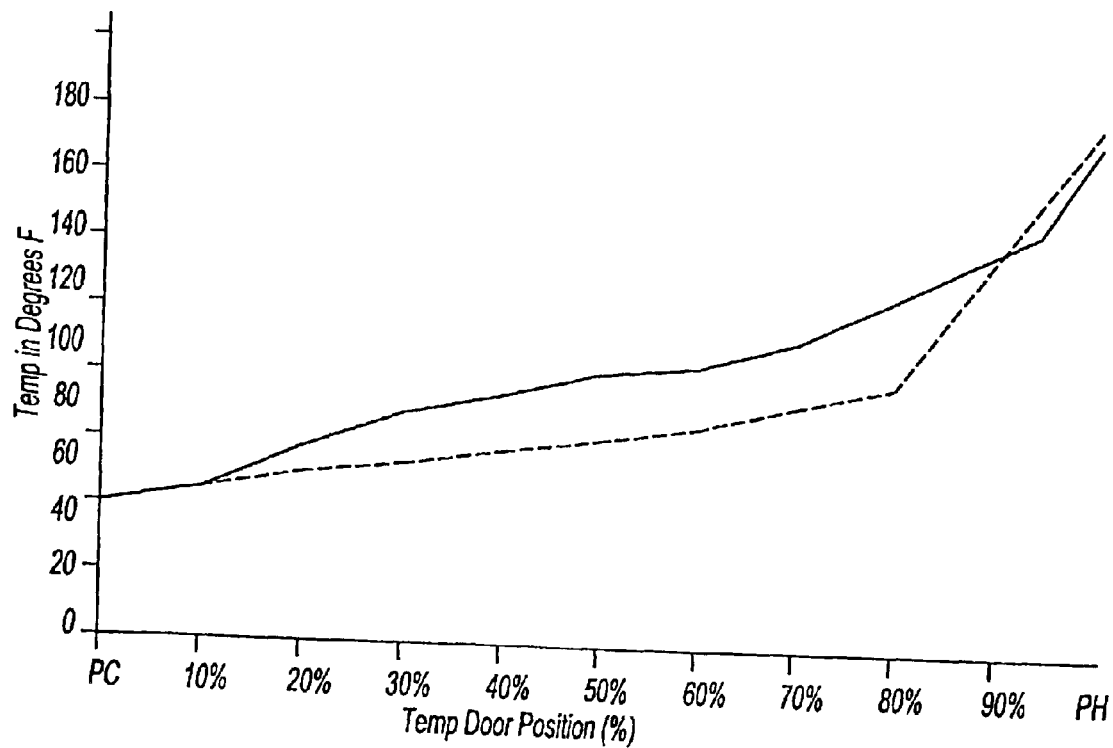
FIG. 9 is a graph illustrating the performance of an HVAC system incorporating an embodiment of the present invention.

Additionally, the height of divider leg 54 can be increased to control the split of mixed air versus hot air delivered respectively between the vent opening typically in the middle of the distribution module and the heater openings typically located at the side areas in the distribution module. Thus, by adjusting the height and width of front portion 52, and by also adjusting the length and angle 'a' 58 of tail portion 56, air partitioning device provides a control of the various temperature splits desired in a vehicle heating, ventilation, and air-conditioning system over other alternative methods. This is further illustrated in FIGS. 8–9 wherein FIG. 8 illustrates the temperature variation as a function of the temperature door 18 (FIG. 1) travel with the prior art U-channel, wherein FIG. 9 illustrates the improved temperature variation performance of air partitioning device 50.

Referring now to FIG. 5, an alternate embodiment 150 of an air partitioning device similar to device 50 is illustrated with like elements like numbered and preceded with the numeral '1'. Air partitioning device 150 has a front portion 152 formed in an L-shape by base leg 153 and divider leg 154, and further includes a tail portion 156 extending rearward from divider leg 154 at an angle. Device 154 differs from the previous embodiment in that leg 154 is formed in a serpentine shape. The undulations of the serpentine shaped leg 154 promote flow instability along leg 154. The resulting flow instability improves the mixing between cold air stream 69 and hot air stream 67 to provide a mixed air stream 70 having a more uniform temperature.

FIG. 6 discloses another embodiment 250 of an air partitioning device similar to device 50 and is illustrated with like elements like numbered and preceded with the numeral '2'. Air partitioning device 250 has a front portion 252 formed in an L-shape by base leg 253 and divider leg 254, and further includes a tail portion 256 extending rearward from divider leg 254 at an angle. Device 254 differs from the previous embodiments in that leg 254 has a plurality of perforations 255 therethrough. Leg 254 having perforations 255 therethrough functions as a porous media which also promotes the efficient mixing of hot air stream 67 with cold air stream 69.

FIG. 7 discloses yet another embodiment 350 of an air partitioning device similar to device 50 and is illustrated with like elements like numbered and preceded with the numeral '3'. Air partitioning device 350 has a front portion 352 formed in an L-shape by base leg 353 and divider leg 354, and further includes a tail portion 356 extending rearward from divider leg 354 at an angle. Device 354 differs from the previous embodiments in that leg 354 has a plurality of vanes 357 extending at regularly spaced intervals from a side of leg 354 such that when installed in an HVAC system, vanes 357 extend into the hot air stream 67. Vanes 357 also disturb the flow of hot air stream 67 in such a manner to promote the efficient mixing of hot air stream 67 with cold air stream 69.

In the foregoing descriptions, those skilled in the art will readily appreciate that modifications may be made to the invention without departing from the concepts disclosed herein. Such modifications are to be considered as included in the following claims, unless these claims by their language expressly state otherwise.

We claim:

1. An air partitioning device for a vehicle heating, ventilation, and air-conditioning system to divide a hot air stream into separate portions, said air partitioning device comprising:
an L-shaped front portion including a base leg and a dividing leg having a serpentine cross section; and
a tail portion extending from a back of said front portion, said tail portion being oriented angularly to said dividing leg.

2. An air partitioning device according to claim 1 wherein said tail portion extends from a back of said dividing leg.

3. An air partitioning device according to claim 2 wherein said tail portion and said dividing leg define an obtuse angle therebetween.

4. An air partitioning device according to claim 3 wherein said tail portion is angled away from said base leg.

5. An air partitioning device according to claim 1 wherein said tail portion tapers from a front part adjacent to said dividing leg to a back end thereof.

6. An air partitioning device for a vehicle heating, ventilation, and air-conditioning system to divide a hot air stream into separate portions, said air partitioning device comprising:
an L-shaped front portion including a base leg and a dividing leg; and
a tail portion extending from a back of said front portion, said tail portion being oriented angularly to said dividing leg,
said dividing leg including a plurality of regularly spaced vanes extending from a face opposite from said base let.

7. An air partitioning device according to claim 6, wherein said tail portion extends from a back of said dividing leg.

8. An air partitioning device according to claim 7, wherein said tail portion and said dividing leg define an obtuse angle therebetween.

9. An air partitioning device according to claim 8 wherein said tail portion is angled away from said base leg.

10. An air partitioning device according to claim 6 wherein said tail portion tapers from a front part adjacent to said dividing leg to a back end thereof.

11. A vehicle heating, ventilation and air-conditioning module of the type having an air conditioning evaporator through which a cold air stream is delivered through a cold air outlet, and a heater core through which a air stream is delivered through a hot air outlet, such that said cold air outlet and said hot air outlet are oriented to cause the hot and cold air streams to mix after passing through their respective outlets for further distribution in a vehicle, said module further including:
at least one air partitioning device comprising an L-shaped front portion having a base leg and a dividing leg having a serpentine cross section, and a tail portion extending from a back of said front portion; wherein:
said air partitioning device is affixed over said cold air outlet and positioned with respect to said hot air outlet to divide a portion of said hot air stream to bypass said cold air outlet.

12. The vehicle heating, ventilation, and air-conditioning module according to claim 11 wherein said tail portion of said at least one air partitioning device extends at least partially into said hot air outlet.

13. The vehicle heating, ventilation, and air-conditioning module according to claim 12 wherein said base leg of said at least one air partitioning device is affixed over and positioned to block a portion of said cold air outlet.

14. The vehicle heating, ventilation, and air-conditioning module according to claim 11 wherein said tail portion tapers from said front portion to a back end thereof.

15. A vehicle heating, ventilation, and air-conditioning module of the type having an air-conditioning evaporator through which a cold air stream is delivered through a cold air outlet, and a heater core through which a hot air stream is delivered through a hot air outlet, such that said cold air outlet and said hot air outlet are oriented to cause the hot and cold air streams to mix after passing through their respective outlets for further distribution in a vehicle, said module further including:

at least one partitioning device comprising an L-shaped front portion having a base lea and a dividing leg and a dividing leg having a serpentine cross section, and a tail portion extending from a back of said front portion, said air partitioning device being affixed over said cold air outlet and positioned with respect to said hot air outlet to divide a portion of said hot air stream to bypass said cold air outlet, said tail portion of said at least one air partitioning device extending at least partially into said hot air outlet, said base leg of said at least one air partitioning device being affixed over and positioned to block a portion of said cold air outlet, said at least one air partitioning device being affixed over said cold air outlet at one side thereof such that said dividing wall and said tail portion define in combination with a side wall defining a portion of said hot air outlet, a passage for an auxiliary hot air stream to flow past said cold air outlet without mixing with said cold air stream.

16. The vehicle heating, ventilation, and air-conditioning module according to claim 15 wherein said tail portion and said dividing leg define an obtuse angle therebetween such that said tail portion in combination with said side wall form a funnel like passageway to said front portion.

17. The vehicle heating, ventilation, and air-conditioning module according to claim 16 including an air partitioning device at each end of said hot air outlet to divide two hot air portions from said hot air stream and prevent the mixing thereof with said cold air stream.

18. A vehicle heating, ventilation, and air-conditioning module of the type having an air conditioning evaporator through which a cold air stream is delivered through a cold air outlet, and a heater core through which a hot air stream is delivered through a hot air outlet, such that said cold air outlet and said hot air outlet are oriented to cause the hot and cold air streams to mix after passing through their respective outlets for further distribution in a vehicle, said module further including:

at least one air partitioning device comprising an L-shaped front portion having a base leg and a dividing leg, and a tail portion extending from a back of said front portion; wherein:

said air partitioning device is affixed over said cold air outlet and positioned with respect to said hot air outlet to divide a portion of said hot air stream to bypass said cold air outlet said dividing leg including a plurality of regularly spaced vanes extending from a face opposite from said base leg.

19. The vehicle heating, ventilation, and air-conditioning module according to claim 18 wherein said tail portion of said at least one air partitioning device extends at least partially into said hot air outlet.

20. The vehicle heating, ventilation, and air-conditioning module according to claim 19 wherein said base leg of said at least one air partitioning device is affixed over and positioned to block a portion of said cold air outlet.

21. The vehicle heating, ventilation, and air-conditioning module according to claim 20 wherein said at least one air partitioning device is affixed over said cold air outlet at one side thereof such that said dividing wall and said tail portion define in combination with a side wall defining a portion of said hot air outlet, a passage for an auxiliary hot air stream to flow past said cold air outlet without mixing with said cold air stream.

22. The vehicle heating, ventilation, and air-conditioning module according to claim 21 wherein said tail portion and said dividing leg define an obtuse angle therebetween such that said tail portion in combination with said side wall form a funnel like passageway to said front portion.

23. The vehicle heating, ventilation, and air-conditioning module according to claim 22 including an air partitioning device at each end of said hot air outlet to divide two hot air portions from said hot air stream and prevent the mixing thereof with said cold air stream.

24. The vehicle heating, ventilation, and air-conditioning module according to claim 18 wherein said tail portion tapers from said front portion to a back end thereof.

25. The vehicle heating, ventilation and air-conditioning module according to claim 18 wherein said dividing leg includes a plurality of regularly spaced vanes extending from a face opposite from said base leg.

26. A method of dividing a hot air stream in a vehicle heating, ventilation, and air-conditioning module having a hot air stream exiting from a hot air outlet adjacent to a cold air outlet exiting a cold air stream for mixing of the hot and cold air streams to prevent the divided portion of the hot air scream from mixing with the cold air stream, the method including the steps of:

forming an air partitioning device comprising an L-shaped front portion having a base leg and a dividing leg and a tail portion extending from a back of said front portion;

affixing the air partitioning device to the vehicle heating, ventilation, and air-conditioning module such that the base leg covers a portion of the cold air outlet and the dividing leg and tail portion separates the hot air stream into a portion that mixes with the cold air stream and an auxiliary hot air portion that bypasses the cold air opening.

27. The method according to claim 26 wherein the affixing step includes affixing an air partitioning device at each side of the hot air outlet to divide off therefrom two auxiliary hot air portions.

* * * * *